United States Patent
Amit et al.

(10) Patent No.: US 9,218,134 B2
(45) Date of Patent: Dec. 22, 2015

(54) READ BASED TEMPORAL LOCALITY COMPRESSION

(71) Applicant: INTERNATIONAL BUSINESS MACHINES CORPORATION, Armonk, NY (US)

(72) Inventors: Jonathan Amit, Omer (IL); Chaim Koifman, Rishon Lezion (IL); Amir Lidor, Binyamina (IL); Sergey Marenkov, Tel Aviv (IL)

(73) Assignee: GlobalFoundries, Inc., Grand Cayman (KY)

( * ) Notice: Subject to any disclaimer, the term of this patent is extended or adjusted under 35 U.S.C. 154(b) by 290 days.

(21) Appl. No.: 13/933,414

(22) Filed: Jul. 2, 2013

(65) Prior Publication Data
US 2015/0012693 A1    Jan. 8, 2015

(51) Int. Cl.
*G06F 3/06* (2006.01)

(52) U.S. Cl.
CPC .............. *G06F 3/064* (2013.01); *G06F 3/067* (2013.01); *G06F 3/0619* (2013.01)

(58) Field of Classification Search
None
See application file for complete search history.

(56) References Cited

U.S. PATENT DOCUMENTS

| 6,009,432 | A | * | 12/1999 | Tarin | 1/1 |
| 7,103,608 | B1 | * | 9/2006 | Ozbutun et al. | 707/604 |
| 7,238,218 | B2 | | 7/2007 | Hepner et al. | |
| 2004/0034616 | A1 | * | 2/2004 | Witkowski et al. | 707/1 |
| 2012/0144098 | A1 | | 6/2012 | Yang et al. | |

OTHER PUBLICATIONS

McKee, AS. e al.; "Dynamic access ordering for streamed computations"; IEEE Transactions on Computers, vol. 49, No. 11, pp. 1255-1271; Nov. 2000.

Tate, J. et al.; "Real-time Compression in SAN Volume Controller and Storwize V7000"; IBM Corporation, www.ibm.com/redbooks/redp4859-00 . . . ; Oct. 2012.

Anonymous; "Methods for compression/decompression of secondary storage content with dynamic dictionary"; http://priorartdatabase.com/IPCOM/000196357; Jun. 1, 2010.

* cited by examiner

*Primary Examiner* — Gary Portka
(74) *Attorney, Agent, or Firm* — Griffiths & Seaton PLLC (57) ABSTRACT

For read based temporal locality compression by a processor device in a computing environment, read operations are monitored, traced, and/or analyzed to identify repetitions of read patterns of compressed data. The compressed data is rearranged based on the repetitions of read order of the compressed data that are in a read order.

17 Claims, 5 Drawing Sheets

READ BASED TEMPORAL LOCALITY COMPRESSION

BACKGROUND OF THE INVENTION

1. Field of the Invention

The present invention relates generally to computers, and more particularly, to read based temporal locality compression in a computing environment.

2. Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components. Data compression is widely used to reduce the amount of data required to process, transmit, or store a given quantity of information. Data compression is the coding of data to minimize its representation. Compression can be used, for example, to reduce the storage requirements for files, to increase the communication rate over a channel, or to reduce redundancy prior to encryption for greater security. However, data compression consumes a significant amount of computing (e.g. central processing unit "CPU") resources. Also, data can be lost due to problems such as system crashes, hardware failures, and abnormal computing system halts. Journaled file systems can be used to maintain data integrity when these types of problems occur.

SUMMARY OF THE DESCRIBED EMBODIMENTS

In one embodiment, a method is provided for read based temporal locality compression using at least one processor device in a computing environment. In one embodiment, by way of example only, read operations are monitored, traced, and/or analyzed to identify repetitions of read patterns of compressed data. The compressed data is rearranged based on the repetitions of the compressed data that are in a read order.

In another embodiment, a computer system is provided for read based temporal locality compression using at least one processor device in a computing environment. The computer system includes a computer-readable medium and at least one processor in operable communication with the computer-readable medium. In one embodiment, by way of example only, read operations, using at least one processor device, are monitored, traced, and/or analyzed to identify repetitions of read patterns of compressed data. The compressed data is rearranged based on the repetitions of the compressed data that are in a read order.

In a further embodiment, a computer program product is provided for read based temporal locality compression by at least one processor device in a computing environment. The computer-readable storage medium has computer-readable program code portions stored thereon. The computer-readable program code portions include a first executable portion that monitors, traces, and/or analyzes read operations are to identify repetitions of read patterns of compressed data. The compressed data is rearranged based on the repetitions of the compressed data that are in a read order.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

In a data processing system or computing environment, a journaling (e.g., a block) storage system may be used to store write operations in a journal (e.g., in a block). In a compressed journal system, the journal (e.g., block) holds compressed data. In one embodiment, a journal system maintains file system integrity by recording information regarding updates to directories, bitmaps, and/or data, in a log, also called a journal, before the updates are written to a storage device such as a hard disk. In the event of a system crash or other problem, the information in the journal may be used to restore the file system to a consistent state. Full-journaling systems additionally perform data journaling, in which data updates are also stored in the journal, to ensure that no committed data is lost. In one embodiment, the ability to access the data randomly is accomplished by dividing the journal into blocks that use a separate dictionary.

Journal (e.g., block) storage may be characterized by the write pattern of the journal/block storage. In one embodiment, data chunks are stored in the order they were written, so a logical offset of the data chunk has little or no relation to the physical location of the data chunk on the storage backend. Each data chunk is stored following the previous data chunk and invalidates any earlier data chunks written to same logical area.

In one embodiment, data may be compressed in the order it is written by the user and/or application (e.g., time-based-compression and/or temporal locality compression). Temporal locality compression means compressing data sequentially in time as opposed to position based compression. The assumption is that data is accessed later on in the same way for both read and write operations. The benefits in using temporal locality compression on write operations are 1) temporal data is more relative from the user and/or application points of view, 2) temporal locality compression results in a much higher compression ratio because of data similarity, and/or 3) temporal locality compression enables advanced read ahead operations (e.g., improves read cache and read performance). However, situations may occur were the pattern of an initial write operation is different than the pattern of the read operation. For example, the following scenarios may experience different patterns in write and read patterns: (1) backup and restore operations (e.g., an application writes data randomly but the backup application and the restore operation of the data reads data sequentially where in this case it is possible to lose the entire temporal locality, with all the benefits mentioned above), (2) volume mirror and/or volume copy operations in both network attached storage (NAS) and storage area network (SAN) NAS/SAN environments will cause the same effect as in (1) (e.g., backup & restore), (3) applications such as image processing/viewing may store the image data sequentially, but when loading the image for viewing, the read pattern is different to enable smooth display, and (4) a database that writes data sequentially but read the data in a different way. Thus a need exists for achieving a better (e.g., increased) compression ratio in the situations of different read patterns and write patterns to improve read ahead operations.

In order to increase the efficiency and productivity achieving a more efficient data compression, the present invention provides a solution for read based temporal locality compression using at least one processor device in a computing environment. In storing and retrieving data compressed and written with temporal locality, the present invention reviews data retrieval patterns for inefficiencies, and then rearranges the compressed data for read temporal locality and rewrite temporal locality. In one embodiment, by way of example only, read operations are monitored, traced, and/or analyzed to identify repetitions of compressed data. It should be noted that throughout the description herein the repetitions may be referred to as "read pattern repetitions." The compressed data is rearranged based on the repetitions of compressed data that are in a read order. The compressed data, which is rearranged, is rewritten with read based temporal locality compression. The benefits of read temporal locality are in situations where write patterns are irrelevant to the relationship of the data, while the read order is relevant to the relationship of the data. The present invention rearranges the compressed data based on repetitions in a read order. The present invention monitors, traces, and/or analyzes the read input/outputs (IOs) to find, locate, and/or identify significant repetitions. After finding the repetitions, the data is transformed on a disk from temporal locality based on write temporal locality to temporal locality based on read temporal locality. In this way, the compression ratio efficiency is increased (e.g., a better compression ratio is provided) and also significant improvement is read ahead operations produced. The newly compressed object (e.g., a file/logical unit number "LUN") now contains temporal locality based on write and temporal locality based on read.

In one embodiment, the present invention provides a solution to transform the access to compressed data based on read temporal locality, which repeats itself, and rewrites the compressed data in a way as if it was originally written with temporal locality. In one embodiment, the present invention (1) gathers (e.g., collects and analyzes) information of the user's read pattern, (2) detects inefficiency in the read workload, and/or (3) rewrites the data based on read temporal locality.

In one embodiment, the present invention collects and analyzes the information relating to the compressed data. In order to collect and analyze the data, the present invention saves the read requests (e.g., an N number of last read requests) in a buffer (e.g., a limited, first-in-first-out (FIFO) queue based buffer). For example, to store the last 1000 read request there may be a need of 12 KB of memory. In one embodiment, present invention also saves an indication whether the reads requests were found in the read cache.

In one embodiment, the detection operation for identifying inefficiencies in the read workload takes the last X number of logs from the logs history sequence, scans the log sequence, and tries to find, identify, and locate matches in the log sequence. It should be noted that "X" is the number of logs that compresses into a data block and depends on an average log length and the compression ratio. A match may be one or more repetitions of that X number of logs in the sequence. If a match is found then those X number of logs will be the candidate for the next optimize rewrite operation, and all matches will be removed from the log sequence. If a match is not found, then those X number of logs will be removed from the log sequence.

In order to reduce central processing unit (CPU) consumption, the detection operation may be enabled and/or disabled on the fly (in real time and immediately) according to inefficiencies identified in the read operations (e.g., read cache misses), a system's load, and the like. The scan interval may also be dynamically adjusted. It should be noted that there is no persistent data that needs to be saved on a storage device (e.g., a disk) because all the relevant information will be collected in real time and saved in memory (e.g., in random access memory "RAM"), and in case of a system failure, the present invention will perform a rebuild operation upon restoration of the process. For example, in one embodiment, a rebuild operation means starting to gather the read pattern information (statistics) from scratch. Moreover, the read pattern statistics are an ongoing process that is continuously being updated.

In one embodiment, the rearrangement of the data may be on a variety of types of storage devices, including but not limited to at least a disk, on random access memory (RAM), and/or on a solid state disk (SSD) or any other types of media. In one embodiment, the read based temporal locality may be first held in RAM and then later on flushed to a disk since it is only read serving data. In one embodiment, the rearranging of the compressed data on a disk occurs once and then receives the benefit of that rearrangement repeatedly (e.g., time after time as opposed to applying the algorithm every time a user and/or an application accesses the data). In one embodiment, the present invention rearranges (e.g., rearranging the source data on a disk according to a user/application read pattern) the compressed data according to an application accessing the data based on processing and/or procedure logic.

In one embodiment, the user and/or application writes data. The data is compressed based on write temporal locality and written to a storage device (e.g., a disk). At this point, if a read pattern of the data is different as compared to a write pattern, the read pattern is determined to be inefficient in terms of prefetching read ahead data. It should be noted that in one embodiment, the inefficiency of the write pattern means that if the data is written in one pattern (e.g., temporal locality/ time based compression) but the read operation is in a different pattern, then from the users point of view the read pattern is random. Because data is compressed as it is received (and not according the position) into fixed size blocks, when user/application sends a read request the whole compressed-block is decompressed into the read-cache. So if the user/application writes and reads the data in a similar patterns then the user will benefit from read-cache (read ahead) because of temporal locality.

After analyzing the data compression and/or the differences in read and write patterns, the present invention rewrites the data according to the read temporal locality and/or alternatively saves the reorganized data according to a read pattern in a RAM (read-cache) and later on will flush to a storage device (e.g., a disk) the reorganized data according to a read pattern. In one embodiment, the analyze process is to determine if the read pattern is different from the write pattern, and thus identifying inefficiencies (e.g., no read-cache hits). For example, if each compressed block holds 5 user's logs (writes), and it is observed that for each read, the entire/whole block is extracted into read-cache but only one log (write) is used and the rest of the 4 logs are not used. In this case there is 80% waste of CPU utilization. Thus, by rearranging the data according to a read pattern increased performance is achieved due to increased read-cache hits and less waste in CPU utilization. After the data is rewritten, the user and/application accessing the data will benefit from the read temporal locality. In one embodiment, the temporal locality means data related in time (for both read and write).

In one embodiment, for read based temporal locality compression by a processor device in a computing environment, read operations are monitored, traced, and/or analyzed to identify repetitions of read patterns of compressed data. The compressed data is rearranged based on the repetitions of read order of the compressed data that are in a read order. For example, if from an analysis it is concluded that a user and/or an application reading blocks b10, b20, b75, b92 are adjacent and each input/output (I/O) is compressed and written to a different compressed block, then the present invention will rewrite those I/Os together and put them in one compressed block. So the next time a user/application reads b10 the present invention will fetch b10 as well as b20, b75, and b92 to read cache. In one embodiment, when a compressed block is decompressed all the IOs go to read cache.

Figure 1:
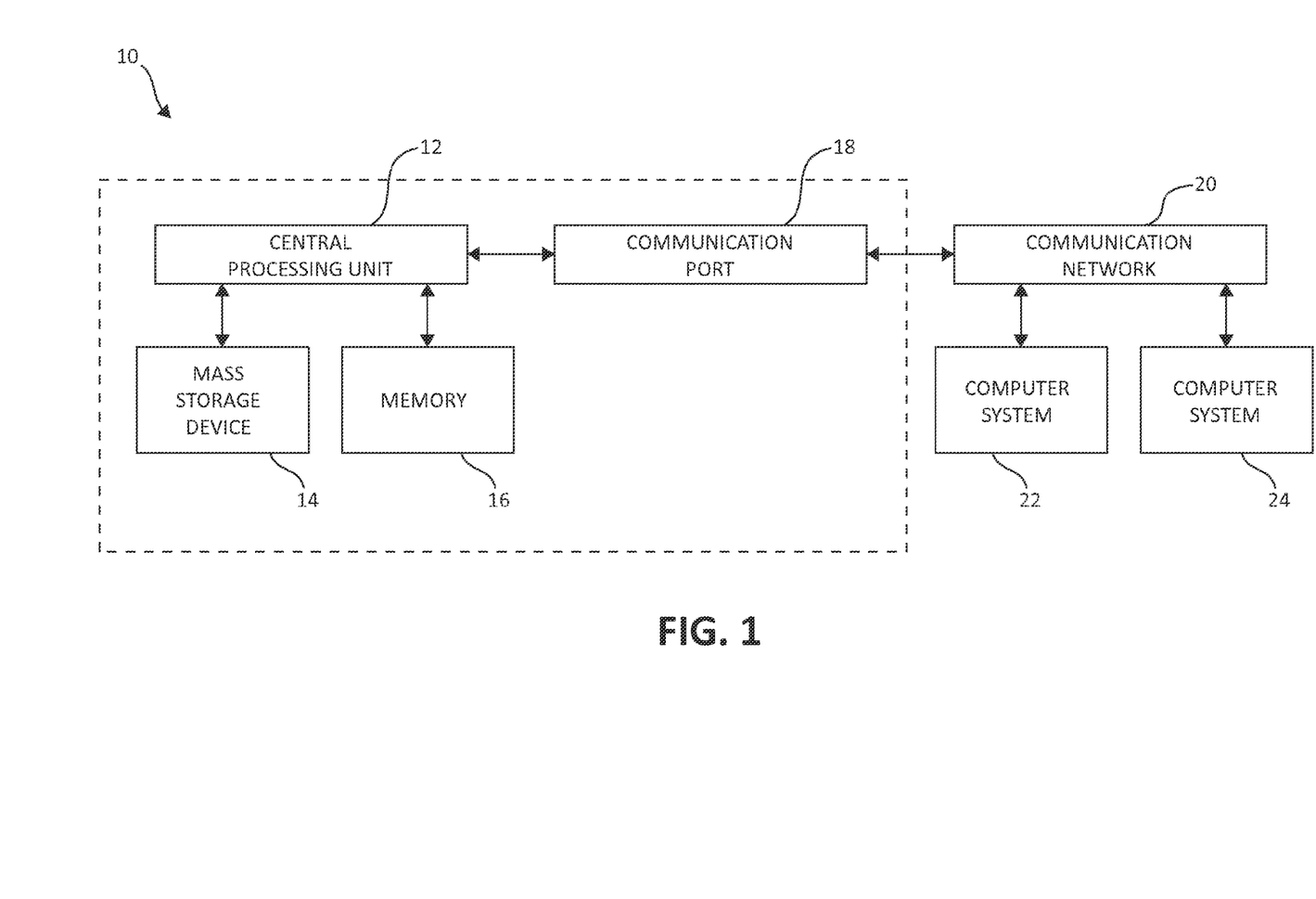
FIG. 1 is a block diagram illustrating a computer storage environment having an exemplary storage device in which aspects of the present invention may be realized.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The garbage collection operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10 to execute and perform each operation described herein to accomplish the purposes of the present invention.

Figure 2:
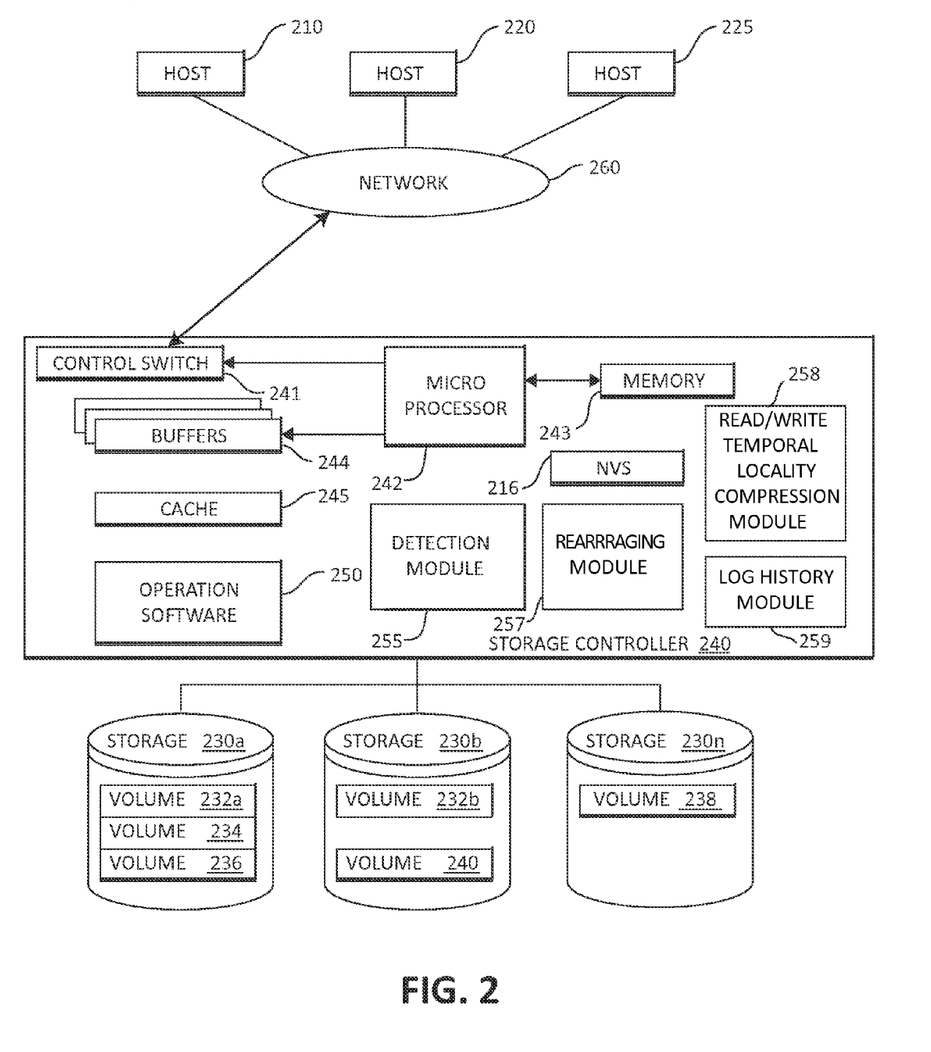
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a detection module 255, a rearranging module 257, a read/write temporal locality compression module 258, and a log history module 259 to assist with garbage collection in a compressed journal file system. The detection module 255, the rearranging module 257, the read/write temporal locality compression module 258, and the log history module 259 may work in conjunction with each and every component of the storage controller 240, the hosts 210, 220, 225, and storage devices 230. Both the detection module 255, the rearranging module 257, the read/write temporal locality compression module 258, and the log history module 259 may be structurally one complete module or may be associated and/or included with other individual modules. The detection module 255, the rearranging module 257, the read/write temporal locality compression module 258, and the log history module 259 may also be located in the cache 245 or other components of the storage controller 240 to accomplish the purposes of the present invention.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and detection module 255, the rearranging module 257, the read/write temporal locality compression module 258, and the log history module 259 in which information may be set. Multiple buffers 244 may be implemented with the present invention to assist with garbage collection in a compressed journal file system as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, and detection module 255, the rearranging module 257, the read/write temporal locality compression module 258, and the log history module 259 are in communication with each other and may be separate or one individual component(s). Also, several, if not all of the components, such as the operation software 245 may be included with the memory 243. Each of the components within the devices shown may be linked together and may be in communication with each other for purposes suited to the present invention.

Figure 3:
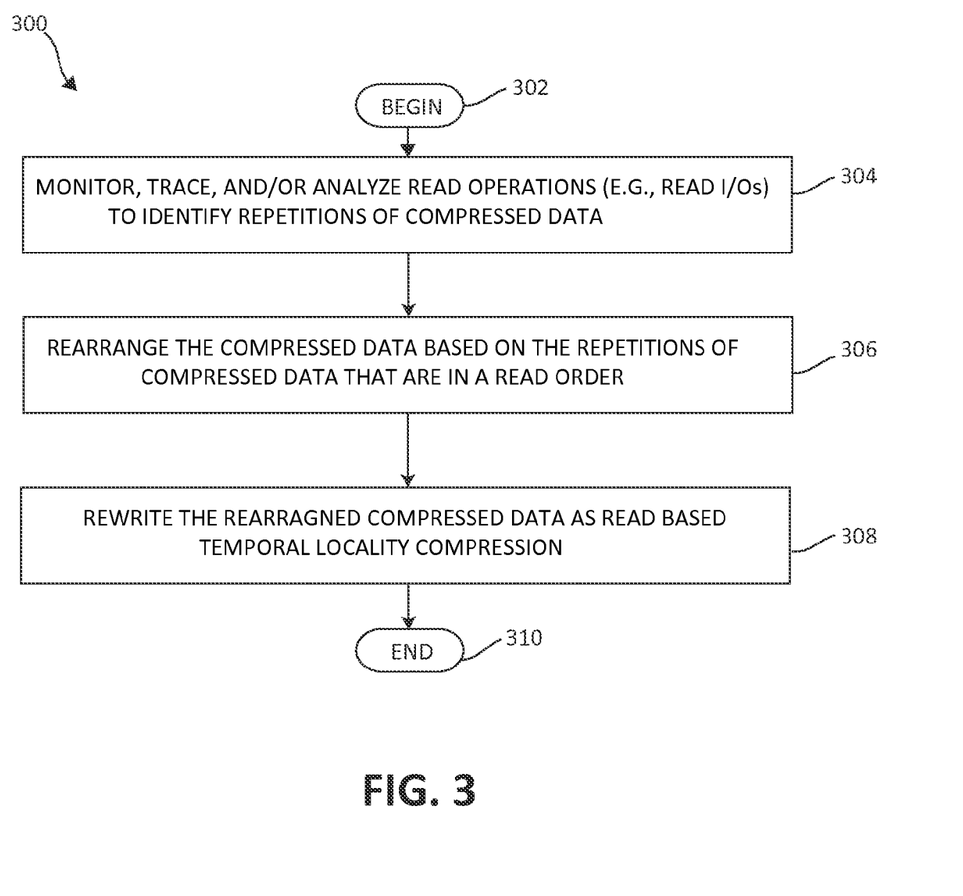
FIG. 3 is a flowchart illustrating an exemplary method for read based temporal locality compression in which aspects of the present invention may be realized.

FIG. 3 is a flowchart illustrating an exemplary method 300 for read based temporal locality compression in which aspects of the present invention may be realized. The method 300 begins (step 302) by monitoring, tracing, and/or analyzing read operations (e.g., read input/outputs) to identify repetitions of compressed data repeating itself (step 304). The method 300 rearranges the compressed data based on the repetitions of the compressed data that are in a read order (step 306). The method 300 rewrites the rearranged compressed data as read based temporal locality compression (step 308). The method 300 ends (step 310).

Figure 4:
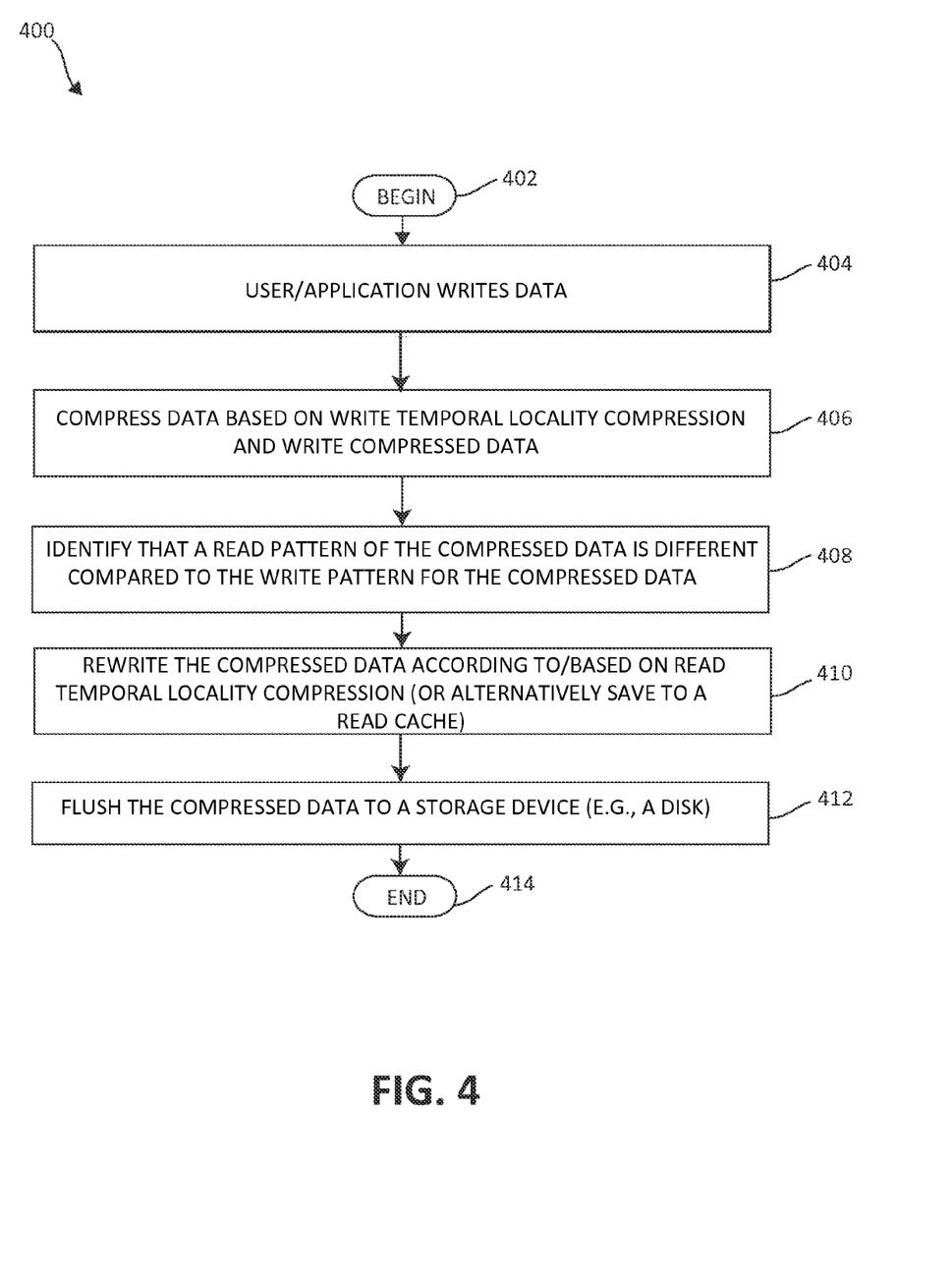
FIG. 4 is a flowchart illustrating an exemplary alternative method for read based temporal locality compression in which aspects of the present invention may be realized.

FIG. 4 is a flowchart illustrating an exemplary alternative method 400 for read based temporal locality compression in which aspects of the present invention may be realized. The method 400 begins (step 402) by a user and/or application writing data (step 404). The method 400 compresses the data based on write temporal locality compression and then writes the compressed data (step 406). The method 400 identifies that a read pattern of the compressed data is different as compared to the write pattern for the compressed data (step 408). The method 400 rewrites the compressed data according to and/or based on read temporal locality compression (and/or alternatively saves it to the read cache) (step 410). The method 400 flushes the compressed data to a storage device (e.g., a disk) (step 412). The method 400 ends (step 414).

Figure 5:
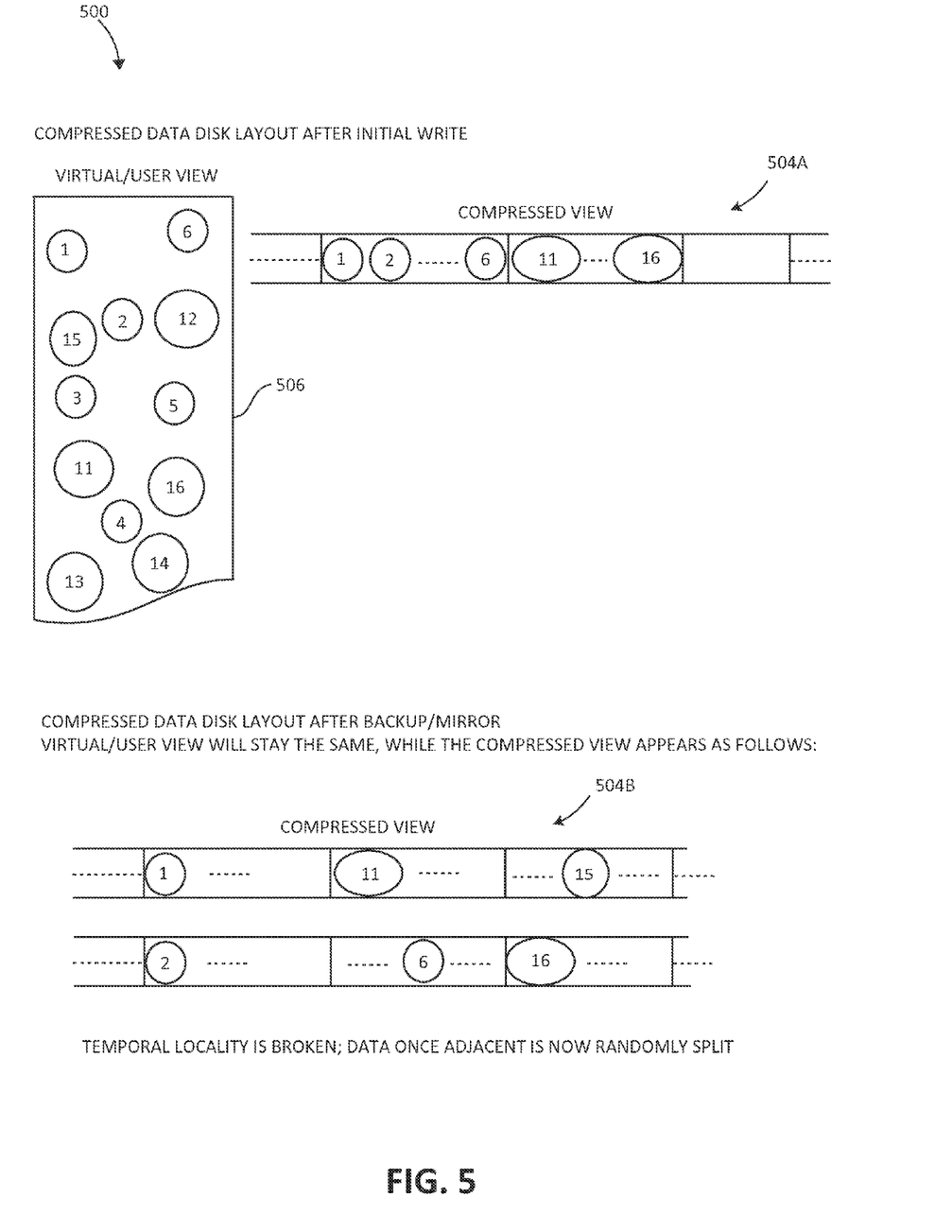
FIG. 5 is a block diagram illustrating a user view and compressed view for before and after read based temporal locality compression in which aspects of the present invention may be realized.

Turning now to FIG. 5, a block diagram 500 illustrating a user view and compressed view of before and after read based temporal locality compression in which aspects of the present invention may be realized is depicted. As illustrated in FIG. 5, a compressed data disk layout after initial write operation is shown in both a virtual/user view 506 and a compressed view 504A. The numbers shows the write orders (using numbers 1, 2, 3, 4, 5, 6, and 11-16 and the numbers are placed within each write order in FIG. 5 for illustration purposes only) and are to different positions of a file. As can be seen from the compressed view 504A, the data is compressed according to a write temporal locality. However, the compressed data disk layout is also illustrated after backup/mirror operation. The virtual/user 506 view will stay the same, while the compressed view 504B changes so that now, it is clearly viewed that the write temporal locality is broken. The data that once was adjacent are now randomly split. In other words, as illustrated by comparing 504A to 504B, write order 1 and write order 2 original writes numbered 1 through 6, which were previously adjacent are now randomly split. Also, write order 11 and write order 16 original writes numbered 11 through 16, which were previously adjacent are now randomly split. As depicted in 504A, the original host write, where it is observed that writes (1) through (6) are compressed to the same compressed-block and writes (11) through (16) were compressed to another compressed-block. It is observed these writes (data) are located randomly in the virtual view 506 of the file/LUN. If the file/LUN will be sequentially copied to another file/LUN then the layout of the data in the new file/LUN will be different, as observed in FIG. 504B. For example, if the user will issue a read for data (1) (2) (3) & (5), in the 504A case the first read request (1) will trigger a read one compressed block operation, decompress it to read cache and the rest of the read requests (2) (3) and (5) will benefit from the 'read ahead' because the read request will be found in read cache. In the 504B case, each read request (1, 2, 3 and 5) will trigger a read compressed block operation from the disk, and decompress it to read cache in response to a user/application read. This is caused because the backup copy broke the original write temporal locality.

Thus, based upon the embodiments described herein, the present invention provides a solution for read based temporal locality compression by a processor device in a computing environment. In one embodiment, the present invention monitors, traces, and/or analyzes read operations to identify repetitions of compressed data. The compressed data is rearranged based on the repetitions of compressed data that are in a read order. The compressed data, which is rearranged, is rewritten as the read based temporal locality compression.

In one embodiment, the present invention gathers (e.g., collects and analyzes) information of the user's read patterns for the read operations, detects inefficiencies in a read workload for each of the read operations, and/or rewrites the compressed data, which is rearranged, as the read based temporal locality compression.

In one embodiment, the present invention performs a write operation of data, compresses the data based on write temporal locality, identifies that the read pattern of the data is different from the write pattern, rewrites the compressed data as the read based temporal locality compression, and thus a new compressed object contains the write temporal locality compression based on the write operation and the read based temporal locality compression based on a read operation, and flushes the compressed data rewritten as the read based temporal locality compression to a storage device.

In one embodiment, the present invention saves each of the read requests in a first-in-first-out (FIFO) queue based buffer of a number of N last read requests, and saves an indication that any of the read operations where located in a read cache.

In one embodiment, an X number of logs are taken from a log sequence of a log history, where X is a number of logs that are compressed into a data block depending on an average log length and/or a compression ratio, identifies matches in the log sequence, and a match is at least one repetition of logs of the X number of logs in the log sequence. If a match in the log sequence is identified, the match is determined, set, and/or positioned as a next candidate for the rewriting of the compressed data as the read based temporal locality compression, and removes the match from the log sequence. If a match in the log sequence is not identified, the X number of logs are removed from the log sequence of the log history.

In one embodiment, enabling and/or disabling the detecting inefficiencies in the read workload for each of the read operations is performed on the fly. The compressed data may also be rearranged on one of a variety of types of storage devices (e.g., a disk), a random access memory (RAM), and a solid-state drive (SSD).

In one embodiment, for read based temporal locality compression by a processor device in a computing environment, read operations are monitored, traced, and/or analyzed to identify repetitions of read patterns of compressed data. The compressed data is rearranged based on the repetitions of read order of the compressed data that are in a read order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for read based temporal locality compression by a processor device in a computing environment, the method comprising:
performing one of monitoring, tracing, and analyzing read operations to identify repetitions of read patterns of compressed data;
rearranging the compressed data based on the repetitions of the compressed data that are in a read order;
rewriting the compressed data, which is rearranged, as the read based temporal locality compression;
performing a write operation of data,
compressing the data based on a write temporal locality compression,
identifying that a read pattern of the compressed data is different from a write pattern,
rewriting the compressed data as the read based temporal locality compression, wherein a new compressed object contains the write temporal locality compression based on the write operation and the read based temporal locality compression based on a read operation, and
flushing the compressed data rewritten as the read based temporal locality compression to a storage device.

2. The method of claim 1, wherein the performing one of monitoring, tracing, and analyzing read operations to identify repetitions of read patterns of compressed data further includes performing each one of:
collecting and analyzing a plurality of information of a read pattern for the read operations, and
detecting inefficiencies in a read workload for each of the read operations.

3. The method of claim 1, further including:
saving read requests in a first-in-first-out (FIFO) queue based buffer of a number of N last read requests, and
saving an indication that any of the read operations where located in a read cache.

4. The method of claim 1, further including performing one of:
taking an X number of logs from a log sequence of a log history, wherein X is a number of logs that are compressed into a data block depending on one of an average log length and a compression ratio,
identifying matches in the log sequence, wherein a match is at least one repetition of logs of the X number of logs in the log sequence,
if a match in the log sequence is identified:
setting the match as a next candidate for the rewriting of the compressed data as the read based temporal locality compression, and
removing the match from the log sequence, and
if a match in the log sequence is not identified:
removing the X number of logs from the log sequence of the log history.

5. The method of claim 1, further including performing on the fly one of enabling and disabling the detecting inefficiencies in the read workload for each of the read operations.

6. The method of claim 1, further including rearranging the compressed data on one of at least a storage device, a read access memory (RAM), and a solid-state drive (SSD).

7. A system for read based temporal locality compression in a computing environment, comprising:
at least one processor device, operable in the computing storage environment, wherein the processor device:
performs one of monitoring, tracing, and analyzing read operations to identify repetitions of read patterns of compressed data,
rearranges the compressed data based on the repetitions of the compressed data that are in a read order,
rewrites the compressed data, which is rearranged, as the read based temporal locality compression,
performs a write operation of data,
compresses the data based on a write temporal locality compression,
identifies that a read pattern of the compressed data is different from a write pattern,
rewrites the compressed data as the read based temporal locality compression, wherein a new compressed object contains the write temporal locality compression based on the write operation and the read based temporal locality compression based on a read operation, and
flushes the compressed data rewritten as the read based temporal locality compression to a storage device.

8. The system of claim 7, wherein the performing one of monitoring, tracing, and analyzing read operations to identify repetitions of read patterns of compressed data further includes performing by the at least one processor device each one of:
  collecting and analyzing a plurality of information of a read pattern for the read operations, and
  detecting inefficiencies in a read workload for each of the read operations.

9. The system of claim 7, wherein the at least one processor device:
  saves read requests in a first-in-first-out (FIFO) queue based buffer of a number of N last read requests, and
  saves an indication that any of the read operations where located in a read cache.

10. The system of claim 7, wherein the at least one processor device performs one of:
  taking an X number of logs from a log sequence of a log history, wherein X is a number of logs that are compressed into a data block depending on one of an average log length and a compression ratio,
  identifying matches in the log sequence, wherein a match is at least one repetition of logs of the X number of logs in the log sequence,
  if a match in the log sequence is identified:
    setting the match as a next candidate for the rewriting of the compressed data as the read based temporal locality compression, and
    removing the match from the log sequence, and
  if a match in the log sequence is not identified:
    removing the X number of logs from the log sequence of the log history.

11. The system of claim 7, wherein the at least one processor device performs on the fly one of enabling and disabling the detecting inefficiencies in the read workload for each of the read operations.

12. The system of claim 7, further including at least one of a storage device, a read access memory (RAM), and a solid state drive (SSD), wherein the at least one processor device performs rearranges the compressed data on one of at least the storage device, the RAM, and the solid state drive (SSD).

13. A computer program product for read based temporal locality compression in a computing environment by a processor device, the computer program product comprising a non-transitory computer-readable storage medium having computer-readable program code portions stored therein, the computer-readable program code portions comprising:
  a first executable portion that performs one of monitoring, tracing, and analyzing read operations to identify repetitions of read patterns of compressed data;
  a second executable portion that rearranges the compressed data based on the repetitions of the compressed data that are in a read order;
  a third executable portion that rewrites the compressed data, which is rearranged, as the read based temporal locality compression; and
  a fourth executable portion that performs a write operation of data,
  compresses the data based on a write temporal locality compression,
  identifies that a read pattern of the compressed data is different from a write pattern,
  rewrites the compressed data as the read based temporal locality compression, wherein a new compressed object contains the write temporal locality compression based on the write operation and the read based temporal locality compression based on a read operation, and
  flushes the compressed data rewritten as the read based temporal locality compression to a storage device.

14. The computer program product of claim 13, wherein the performing one of monitoring, tracing, and analyzing read operations to identify repetitions of read patterns of compressed data further includes a fifth executable portion that performs each one of:
  collecting and analyzing a plurality of information of a read pattern for the read operations, and
  detecting inefficiencies in a read workload for each of the read operations.

15. The computer program product of claim 13, further including a fifth executable portion that performs one of:
  taking an X number of logs from a log sequence of a log history, wherein X is a number of logs that are compressed into a data block depending on one of an average log length and a compression ratio,
  identifying matches in the log sequence, wherein a match is at least one repetition of logs of the X number of logs in the log sequence,
  if a match in the log sequence is identified:
    setting the match as a next candidate for the rewriting of the compressed data as the read based temporal locality compression, and
    removing the match from the log sequence, and
  if a match in the log sequence is not identified:
    removing the X number of logs from the log sequence of the log history.

16. The computer program product of claim 13, further including a fifth executable portion that performs on the fly one of enabling and disabling the detecting inefficiencies in the read workload for each of the read operations.

17. The computer program product of claim 13, further including a fifth executable portion that rearranges the compressed data on one of at least a storage device, a random access memory (RAM), and a solid state drive (SSD).

* * * * *